United States Patent [19]

Long et al.

[11] 4,293,766

[45] Oct. 6, 1981

[54] RAIL CAR IDENTIFICATION APPARATUS

[75] Inventors: Lennart E. Long, Waltham; Robert L. Wiseman, Lexington, both of Mass.

[73] Assignee: The United States of America as represented by the Secretary of Transportation, Washington, D.C.

[21] Appl. No.: 89,431

[22] Filed: Oct. 30, 1979

[51] Int. Cl.³ .................... G06K 7/10; G06K 13/00
[52] U.S. Cl. .............................. 235/462; 235/454; 235/476; 250/566
[58] Field of Search ................. 235/462, 454, 476; 250/566

[56] References Cited

U.S. PATENT DOCUMENTS 3,529,133 9/1970 Kent et al. ........................ 235/462
3,541,310 11/1970 Stites ................................ 235/462
3,983,366 9/1976 Gunn ................................ 235/454

Primary Examiner—Robert M. Kilgore
Attorney, Agent, or Firm—Herbert E. Farmer; Harold P. Deeley, Jr.

[57] ABSTRACT

A simulated rail car identification system including a plurality of coded labels mounted at spaced apart locations on an endless conveyor. The conveyor produces horizontal movement of the labels sequentially through a zone viewed by an optical scanner. A control system monitors and controls operation of the endless conveyor and generates block signals responsive to the relative position thereof and wheel signals responsive to the entry of individual labels into the viewing zone. Processing and decoding of the information retained by the moving labels is accomplished by a data processor that receives the output of the scanner and the block and wheel signals from the control system. The effectiveness of the scanner and processor are determined by comparing their output to the data programmed into the control system and encoded on the moving labels.

8 Claims, 8 Drawing Figures

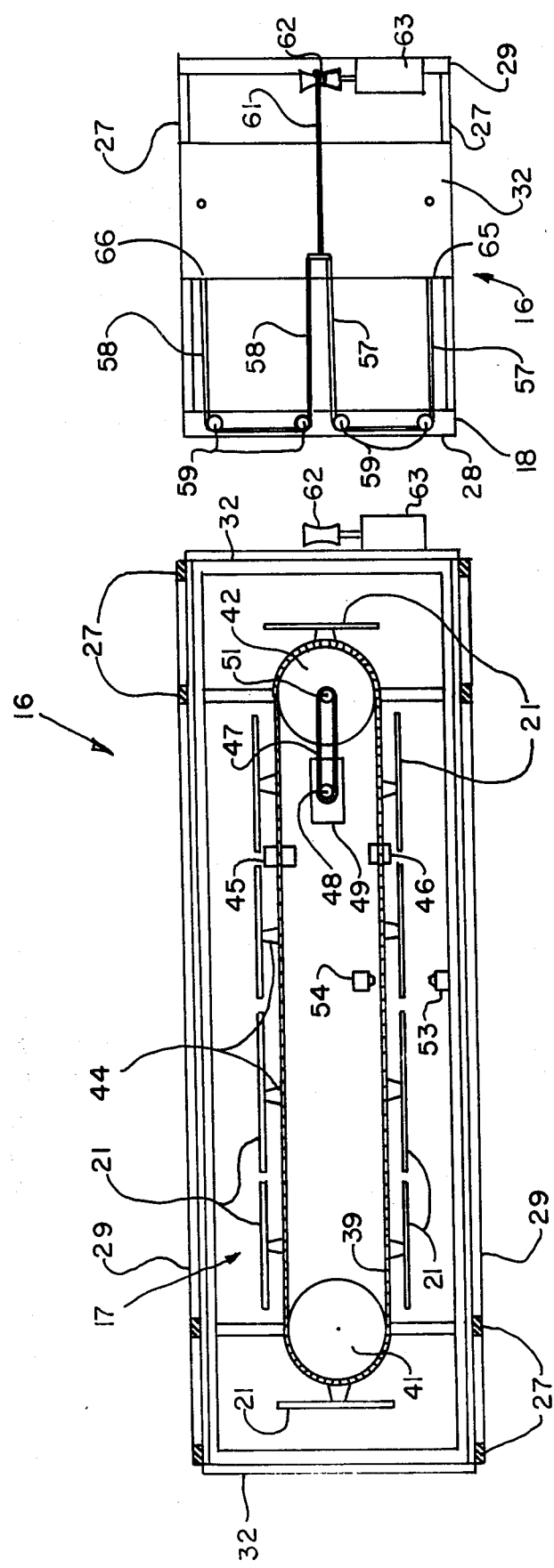

RAIL CAR IDENTIFICATION APPARATUS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates generally to a method and apparatus for simulating moving objects and, more particularly, to a method and apparatus for simulating the passage of railroad cars over a particular section of railroad track.

Various systems have been developed for identifying moving railroad cars or other vehicles. Examples of such systems are disclosed in U.S. Pat. Nos. 3,417,231; 2,541,310; 3,543,007 and 3,731,067. As disclosed in those patents, labels are encoded with a plurality of reflective stripes that represent data pertinent to particular railroad cars and are then affixed to the sides thereof. As a railroad car passes a track-side optical scanning unit, the coded pattern of a retained label is sensed and translated into electrical signals which are appropriately processed and decoded to obtain the information encoded on the label. Although the use of such scanning identification systems is quite promising, certain problems do exist. For example, because of the size and operating costs of the railroad equipment involved, field testing of such scanning systems is both expensive and burdensome. These factors have hindered both advanced development and repair of scanning railroad car identification systems.

The object of this invention, therefore, is to provide a test system for simulating the movement of rail cars by an identification scanning system.

SUMMARY OF THE INVENTION

The invention is a simulator of a rail car identification wayside system and includes a plurality of coded labels mounted at spaced apart locations on an endless conveyor. The conveyor produces horizontal movement of the labels sequentially through a zone viewed by an optical scanner. A control system monitors and controls operation of the endless conveyor and generates block signals responsive to the relative position thereof and wheel signals responsive to the entry of individual labels into the viewing zone. Processing and decoding of the information retained by the moving labels is accomplished by a data processor that receives the output of the scanner and the block and wheel signals from the control system. The effectiveness of the scanner and processor are determined by comparing their output to the data programmed into the control system and encoded on the moving labels.

Features of the present invention are the provision in the above-described simulator of an adjustment mechanism for selectively adjusting the vertical position of the endless conveyor and sensors for producing signals indicative of the conveyor's relative position and of the entry of given labels into the viewing zone. The output signals from the sensors are used to produce the block and wheel signals for the scanner processing unit and the vertical adjustment mechanism permits selective testing of the scanning system's vertical limits.

The invention also includes operational methods for synthesizing increased rail car separation and speed with the above-described simulator equipment. By processing only certain portions of the repetitive scans over a given coded label passing through the viewing zone, a label travel speed in excess of its actual speed is synthesized. Similarly, increased physical separation between adjacent labels is synthesized by staggering those labels on the endless conveyor that are actually scanned and decoded by the scanning and processing system.

DESCRIPTION OF THE DRAWINGS

These and other objects and features of the present invention will become more apparent upon a perusal of the following description taken in conjunction with the accompanying drawings wherein:

FIG. 3 is a schematic cross-sectional view taken along lines 3—3 of FIG. 2;

FIG. 4 is a side view of the transport mechanism shown in FIGS. 2 and 3;

DESCRIPTION OF THE PREFERRED EMBODIMENT

Figure 1:
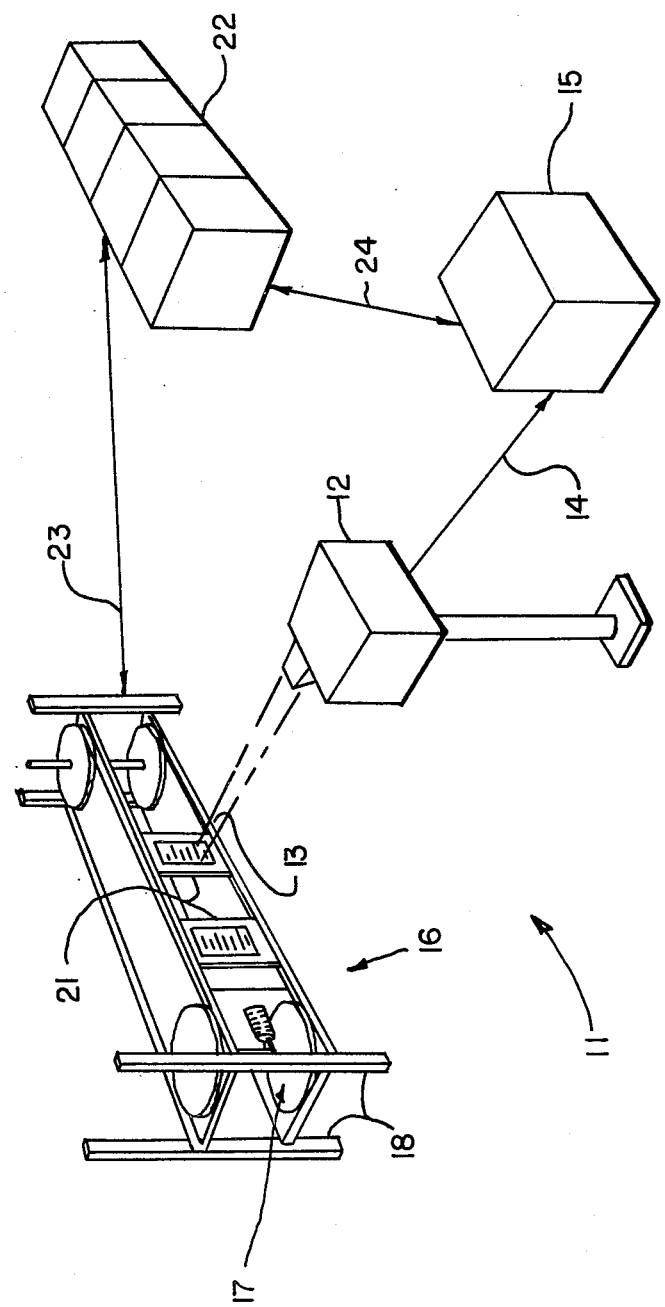
FIG. 1 is a pictorial illustration of a simulated rail car identification system according to the invention.

Pictorially illustrated in FIG. 1 is a simulated rail car identification system 11 according to the invention. An optical scanner 12 executes repetitive vertical scans of objects located in a specific viewing zone 13. Signal outputs from the scanner 12 are supplied on lines 14 to processing system 15. A transport mechanism 16 includes an endless conveyor 17 mounted on a fixed frame 18. Secured to the endless conveyor 17 for movement therewith are a plurality of coded labels 21 of the type placed on rail cars to provide identification thereof. The conveyor 17 sequentially moves the individual labels 21 through the viewing zone 13 in which they are scanned optically by the scanner 12. Control signals are exchanged over lines 23 and 24 between a control system 22 and both the transport mechanism 16 and the scanner-processor 15. During operation of the system 11, the control circuit 22 controls and monitors the movement of the coded labels 21 through the viewing zone 13, simulating therewith the movement of coded rail cars. This simulated movement of rail cars is identified and catalogued by the scanner 12 and the processor 15 in a manner disclosed in above-noted U.S. Pat. Nos. 3,417,231; 2,541,310; 3,543,007 and 3,731,067.

Figure 2:
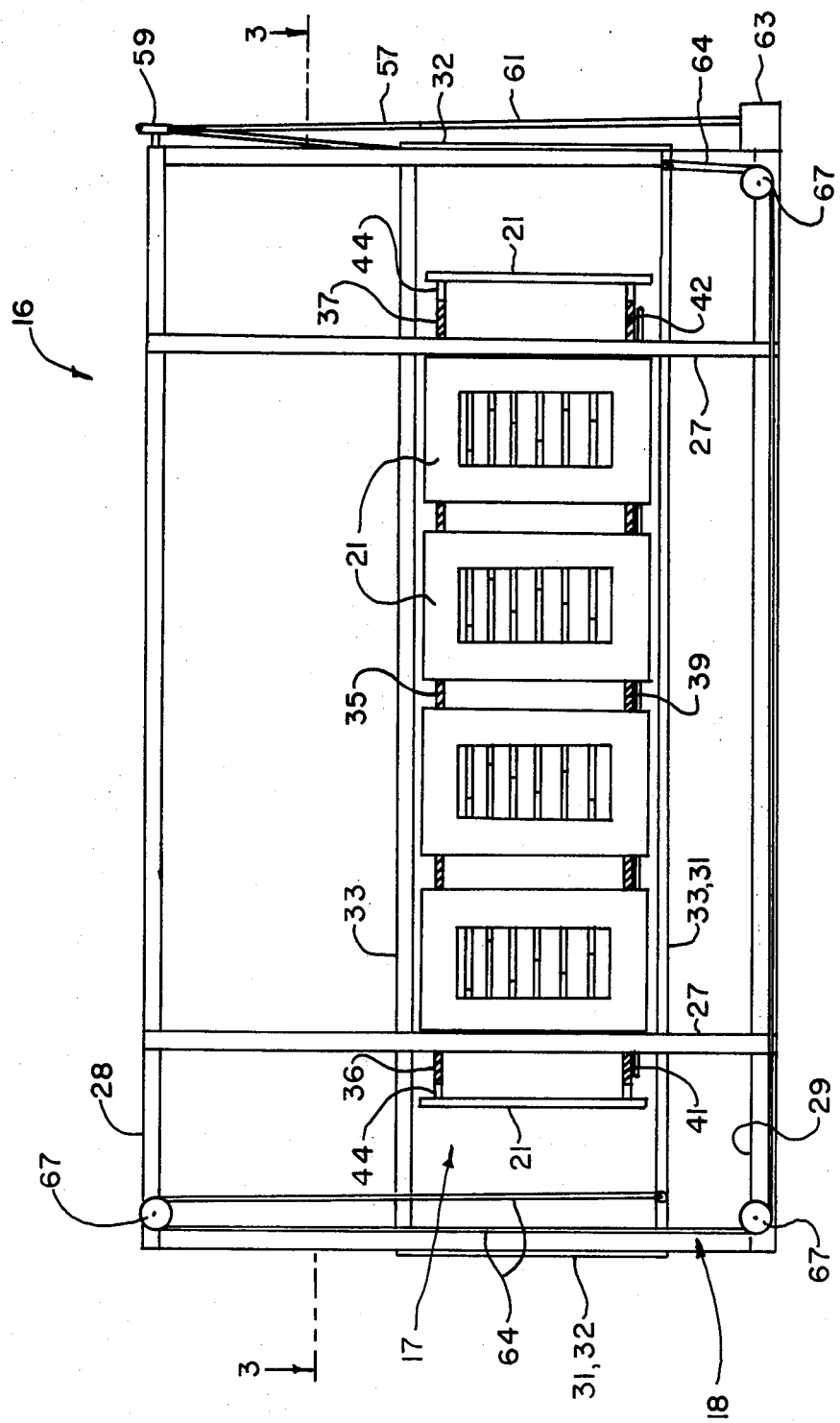
FIG. 2 is a schematic front elevational view of a transport mechanism shown in FIG. 1.

Referring now to FIG. 2 there is shown in greater detail the transport mechanism 16. Forming the fixed frame 18 are a plurality of vertical struts 27 that extend between top and bottom rectangular support structures 28 and 29. A frame 31 is mounted for vertical movement along the struts 27 and includes a pair of end plates 32 joined by horizontal support bars 33. Supported by the movable frame 31 is the endless conveyor 17 formed by an upper chain 35 that extends around upper sprockets 36 and 37 and a lower chain 39 that extends around lower sprockets 41 and 42.

As shown most clearly in FIG. 3, the coded labels 21 are secured to the endless transport chain 39 by centrally located brackets 44. Also mounted for movement with the lower chain 39 is a reflective block 45 that interacts with a stationary optical sensor 46 as described hereinafter. Movement of the transport chain 39 is produced by a drive chain 47 that extends between a drive sprocket 48 of a motor, clutch and gear box assembly 49 and a sprocket 51 fixed to the lower sprocket 42. Also mounted at spaced apart locations on the movable frame 31 are a light source 53 and a light sensor 54 between which traverse the moving labels 21. The functions of the light source 53, the sensor 54, the block 45 and the sensor 46 are described below.

Figure 6:
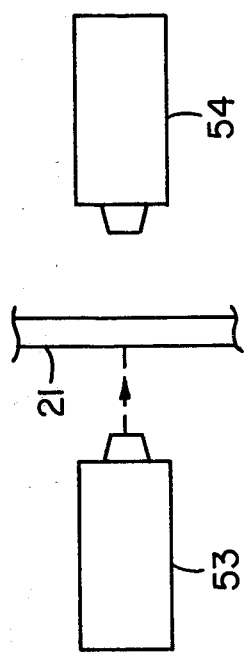
FIG. 6 is a detailed view of a label position sensor shown in FIG. 3.
Figure 5:
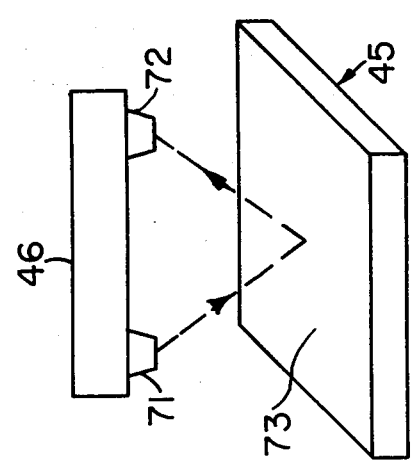
FIG. 5 is a detailed view of a conveyor position sensor shown in FIG. 3.

A mechanism for producing vertical movement of the movable frame 31 and the endless conveyor 17 is shown most clearly in FIG. 4. Ends of a pair of cables 57 and 58 are secured to opposite sides of the end plate 32. The cables 57 pass over pulleys 59 fixed to the stationary frame 18 and have opposite ends attached to a single cable 61 that extends around a winch 62 coupled to a drive motor 63. As the cable 61 is wound upon the winch 62, the cables 57 and 58 lift the movable frame 31 within the fixed frame 18. Conversely, the movable frame 31 is allowed to move downwardly in the fixed frame 18 in response to withdrawal of the cable 61 from the winch 62. To distribute the forces applied by the cables 57 and 58 and thereby maintain alignment to the movable frame 31 within the fixed frame 18, there are provided front and rear alignment cables 64, one of which is illustrated in FIG. 2. The cable 64 has opposite ends 65 and 66 fixed to opposite ends of the movable frame 31 and extends over pulleys 67 attached to the fixed frame 18. A lifting force applied by the cables 57 and 58 to one end of the frame 31 is transferred to the opposite end thereof by the cables 64. The vertical adjustment mechanism illustrated in FIG. 4 permits selective vertical positioning of the movable frame 31 and thereby of the coded labels 21. Because of this vertical adjustment capability, the vertical limits of the viewing zone 13 established by the scanner 12 can be tested. As shown in FIG. 5, the sensor 46 includes a light source 71 and a light sensor 72. The source 71 and the sensor 72 are oriented, respectively, so as to direct light onto and receive light from a reflective surface 73 on the block 45. During continuous movement of the endless conveyor 17, the block 45 passes the sensor 46 once during each complete revolution of the chain 39. In response thereto, the light sensor 72 receives light reflected from the surface 73 and produces a signal indicating the relative position of the conveyor 17 on the transport mechanism 16. Additional signals are produced by the light sensor 54 during periods when light from the light source 53 is blocked by a label 21 passing therebetween as illustrated in FIG. 6. The light source 53 and the light sensor 54 are aligned with a vertical periphery of the viewing zone 13 into which the labels 21 move. Thus, the label position output signals of the light sensor 54 indicate that a coded label 21 is entering the viewing zone 13.

Figure 7:
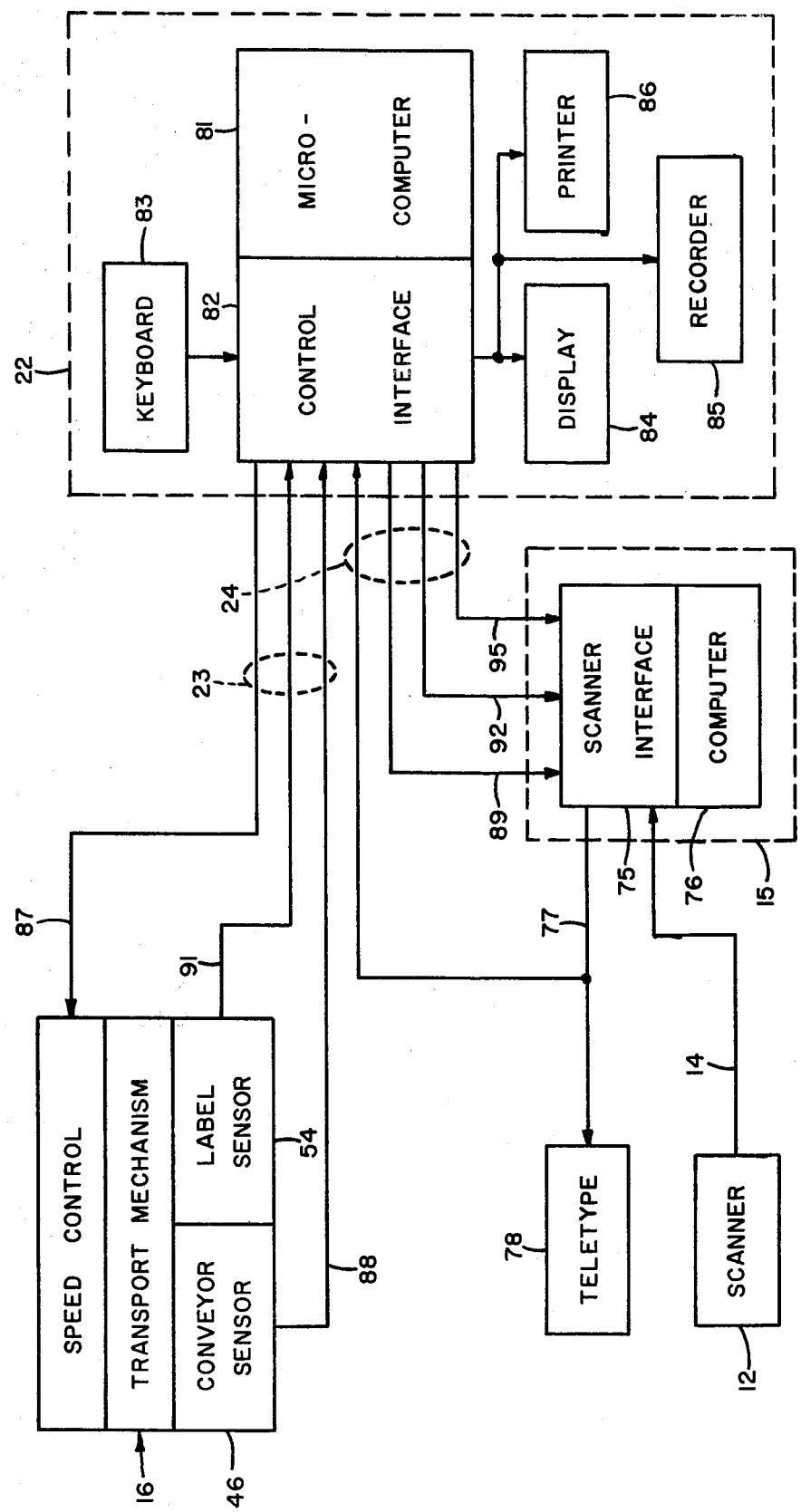
FIG. 7 is a schematic block diagram of the simulated rail car identification system illustrated in FIG. 1.

Referring now to FIG. 7, the simulator system is shown in block diagram form. Output signals from the scanner 12 are produced by scans of the labels passing through the viewing zone. Those signals are supplied on lines 14 to a scanner interface 75 connected to a computer 76. Typically, the computer 76 would be a remote time-shared facility connected to the interface 75 by telephone lines. The system 15 processes the scanning information in the manner disclosed in the above-noted U.S. Patents and generates output signal data that is supplied on lines 77 to a teletype 78 and to the control system 22. As shown, the control system includes a micro-computer 81 and an associated interface 82. Input to the system is provided by a keyboard 83 while output data is supplied to a display 84, a recorder 85 and a printer 86.

System operation is initiated by the control system 22 which supplies speed control signals to the conveyor. These signals selectively determine the speed of the conveyor and the labels in a range, for example, between zero and six miles per hour. In response to the conveyor position signals received from the sensor 46 on a line 88, the control system 22 produces on a line 89 block signals that are transmitted to the scanner interface 75. Similarly, the label position signals from the sensor 54 on a line 91 are used by the control system 22 to generate wheel signals that are supplied to the scanner interface 75 on a line 92. As also described in the abovenoted U.S. patents, block signals indicate the entry of a train onto a given block of track being monitored by a scanning system and wheel signals indicate the entry of both leading and trailing wheels of a specific rail car into the scanning zone. Wheel signals representing leading wheels coincide with the label position signals on line 91 that indicate the entry of a label into the viewing zone. Trailing wheel signals are synthesized in the control system 22 which utilizes the known dimensions of a label and the speed of the conveyor to determine when that label leaves the viewing zone.

To more closely simulate the actual physical separation between the labels on rail cars of an actual train, not all of the conveyor and label position signals on the lines 88 and 91 are used to generate block and wheel signals on the lines 89 and 92. For example, after generation of an initial block signal in a ten-label system, the first label entering the viewing zone would prompt the production of wheel signals, the succeeding ten labels passing through the viewing zone would be ignored, the second label in the system would prompt the generation of wheel signals upon its second passage through the viewing zone, the succeeding ten labels would be ignored, the third label would prompt the generation of wheel signals upon its third transition through the viewing zone, etc. In this way each label of the system is ultimately scanned but a larger physical separation between the scanned labels is synthesized.

Figure 8:
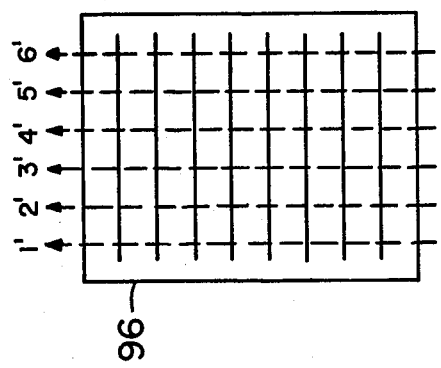
FIG. 8 is a diagrammatic illustration of a coded label scanning pattern.

According to another feature of the invention, the control system 22 produces speed synthesis signals that are supplied on line 95 to the scanner interface 75. These signals permit the transport system 16 to simulate label speeds substantially greater than the actual speed provided by the endless conveyor. Because of this feature the mechanical requirements of the transport system to simulate actual train speeds are substantially reduced. Illustrated in FIG. 8 is a typical scanning pattern of a coded label 96 moving through the viewing zone. Since scanning speed is constant, the number of vertical scans completed of a label moving through the viewing zone is dependent upon the speed at which the label is moving. Thus, in the example of FIG. 8, the completion of six vertical scans 1′, 2′, 3′, 4′, 5′ and 6′ would be interpreted by the processing system as a given train speed. However, the speed synthesizer signals on line 95 in FIG. 7 are used to suppress signals in the scanner interface 75 and thereby prevent the processing of predetermined scan signals. For example, by suppressing the output represented by the scans 2', 3', 5' and 6' in the example depicted in FIG. 8, signals on line 95 are able to synthesize for the processor 15 a label speed of three times its actual speed.

Upon completion of a test run, the control system 22 provides an output to the display 84, the recorder 85 and the printer 86 that compares the data produced by the processor system 15 with that programmed into the interface 82 and tabulated on the labels 21. In this way a given scanning and processing system can be accurately tested without the burdensome requirement of being installed in the field for use with actual trains. Thus, the simulation system 11 can be used for the development of improved scanning systems, to evaluate production scanning equipment before installation in the field or to test scanning equipment that has proven faulty in the field.

Obviously, many modifications and variations of the present invention are possible in light of the above teachings. It is to be understood, therefore, that the invention can be practiced otherwise than as specifically described.

What is claimed is:

1. Apparatus for simulating a rail car identification system comprising:
    a plurality of coded labels;
    transport means for sequentially moving each of said coded labels through a viewing zone;
    optical scanning means for scanning said coded labels in said viewing zone;
    control circuit means for controlling said transport means comprising endless conveyor means and wherein said coded labels are mounted at spaced apart locations on said endless conveyor means;
    processor means for processing the output of said optical scanning means;
    label sensor means for detecting the entry of each of said labels into said viewing zone and supplying label position signals to said control circuit means in response thereto;
    conveyor position sensor means for detecting the entry into said viewing zone of a particular portion of said endless conveyor means and supplying conveyor position signals to said contol circuit means in response thereto; and
    wherein said control circuit means comprises speed control means for selectively controlling the speed of said endless conveyor means.

2. Apparatus according to claim 1 wherein said control circuit means comprises signal means for supplying wheel signals to said processor means in response to said label position signals.

3. Apparatus according to claim 1 wherein said signal means supplies block signals to said processor means in response to said conveyor position signals.

4. Apparatus according to claim 1 wherein said scanning means is adapted to produce repetitive vertical scans of said viewing zone, and said control circuit means comprises speed synthesizer means for providing said processor means with gating signals that gate signals generated by said scanning means during predetermined vertical scans of said viewing zone.

5. Apparatus according to claim 1 wherein said control circuit means comprises speed control means for selectively controlling the speed of said endless conveyor means.

6. Apparatus according to claim 1 wherein said control circuit means comprises signal means for supplying wheel signals to said processor means in response to said label position signals.

7. Apparatus according to claim 1 wherein said endless conveyor means is oriented so as to produce horizontal movement of said coded labels.

8. Apparatus according to claim 1 wherein said transport means comprises vertical adjustment means for altering the vertical position of said endless conveyor means.

* * * * *